Figure 1:
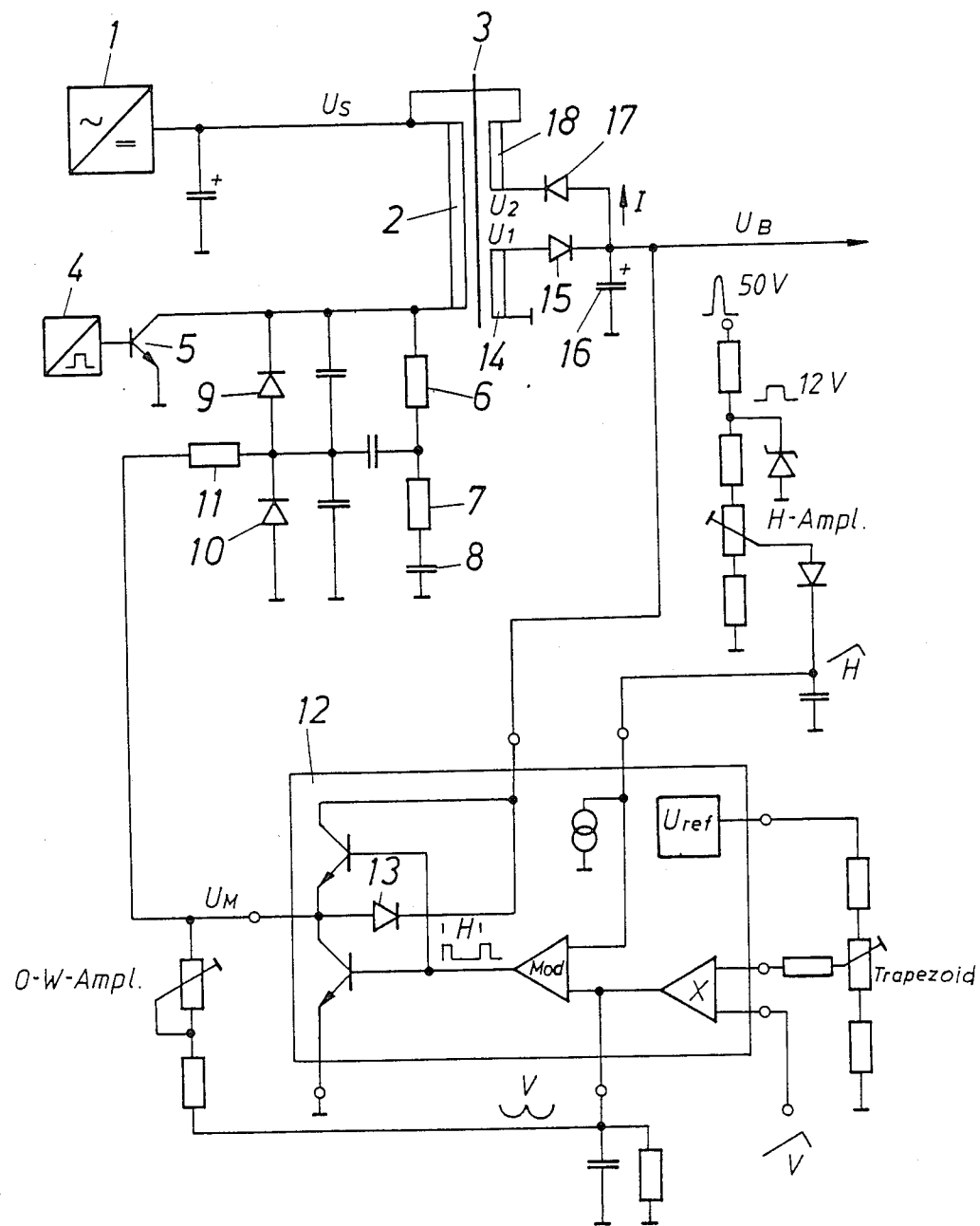

United States Patent [19]

Dieterle et al.

[11] Patent Number: 4,814,672

[45] Date of Patent: Mar. 21, 1989

[54] CIRCUITRY FOR LIMITING AN OPERATING VOLTAGE OBTAINED BY WAY OF A RECTIFIER FROM A SECONDARY WINDING OF A TRANSFORMER

[75] Inventors: Franz Dieterle, St. Georgen; Uwe Hartmann; Udo Mai, both of Villingen-Schwenningen, all of Fed. Rep. of Germany

[73] Assignee: Deutsche Thomson-Brandt GmbH, Villingen-Schwenningen, Fed. Rep. of Germany

[21] Appl. No.: 164,104

[22] Filed: Mar. 4, 1988

[30] Foreign Application Priority Data

Mar. 12, 1987 [DE]  Fed. Rep. of Germany ....... 3707929

[51] Int. Cl.$^4$ ............................................ H01J 29/70
[52] U.S. Cl. .................................. 315/411; 358/190; 358/243; 363/21
[58] Field of Search ................ 315/411; 358/190, 243; 363/21

[56] References Cited

U.S. PATENT DOCUMENTS 3,936,719  2/1976  Miyoshi et al. ..................... 315/411
4,144,480  3/1979  Nagasaki et al. .................. 315/411

Primary Examiner—Theodore M. Blum
Attorney, Agent, or Firm—Max Fogiel

[57] ABSTRACT

Circuitry for limiting a rectified operating voltage.

To recover energy from unutilized power from the secondary winding of a switching-network transformer, it is recirculated to the primary winding through a diode. When appliances fail, the excess energy component can increase to the extent that components are destroyed because the operating voltage increases.

To prevent this situation the excess energy is recirculated into a higher operating voltage $U_S$ through a diode and through another secondary winding of the transformer. The number of turns in the second secondary winding and its polarity ensure that the flyback voltage $U_R$ will be higher than the difference between $U_S$ and $U_B$.

Switching-network components in conjunction with rectifier modulators in television receivers.

4 Claims, 2 Drawing Sheets

CIRCUITRY FOR LIMITING AN OPERATING VOLTAGE OBTAINED BY WAY OF A RECTIFIER FROM A SECONDARY WINDING OF A TRANSFORMER

The invention concerns circuitry for limiting an operating voltage obtained by way of a rectifier from a secondary winding of a transformer, the primary winding of which is at an operating voltage that is higher than and stabilized in relation to the first operating voltage and which can be switched over to reference potential by means of an electronic switch that trips at regular intervals.

Circuitry of this type is described in German Pat. No. 2 433 074. To recover power from output that is not employed at the secondary end and hence save energy the circuitry is coupled into the primary winding of the transformer through a diode. Since, however, this occurs while the horizontal deflection is sweeping forward, any oscillations that occur at the beginning of the forward sweep will show up to an undesirable extent in the form of vertical stripes at the left edge of the picture. Furthermore, almost all of the return-sweep voltage of the switching transistor will be at the diode in the known circuitry because the infeed point in the primary winding is near the switching-transistor collector.

The object of the present invention is to obtain high reliability in very simple circuitry. The object is attained by the invention recited in the major claim. Other embodiments of the invention will be evident from the subsidiary claims.

A concrete and proven embodiment of the invention will now be described in detail with reference to the drawing.

FIG. 1 is a circuit diagram of the essential components of the invention.

Figure 2:
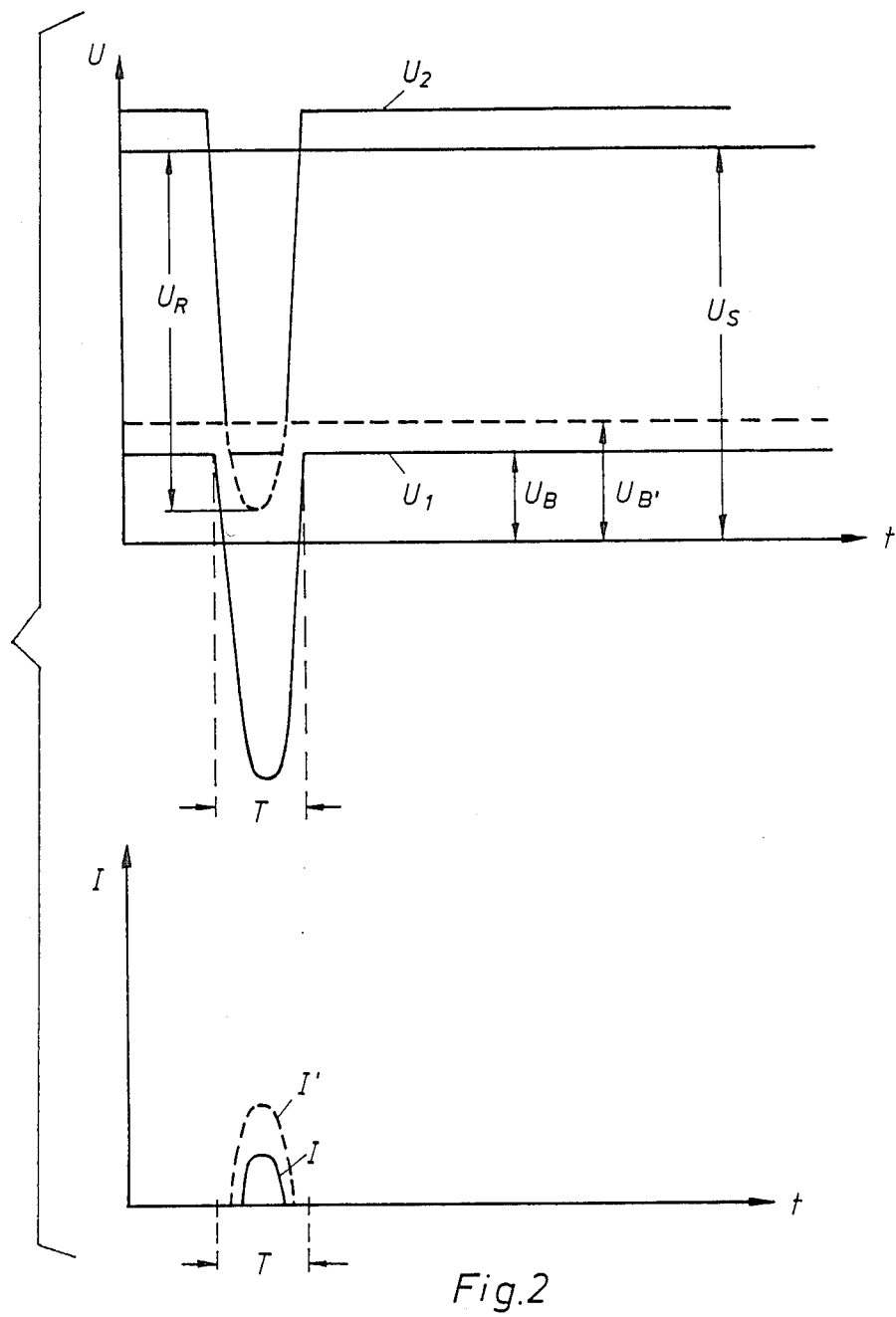

FIG. 2 consists of graphs that elucidate how the circuitry illustrated in FIG. 1 operates.

The embodiment of the invention will be described consists of circuitry for a rectifier modulator in a television receiver. The purpose of the rectifier modulator in a television receiver is to equalize what is called an "east-to-west pincushion," which occurs when the center of curvature of the convex surface of the screen does not coincide with the center of electron-beam deflection. A rectifier modulator for equalizing projection defects is thoroughly described in German Pat. No. 2 031 218. The operating voltage for the horizontal-deflection stage with integrated eastto-west correction is so high that the deflection circuit will, unless the deflection current is modulated, absorb more power than what is needed to obtain a precise picture width. To narrow the picture width to a precise dimension, energy is removed from the deflection circuit by the aforesaid rectifier modulator. This energy is not converted into heat and dissipated, but, in accordance with the teaching disclosed in German Pat. No. 2 433 074, is returned to an operating-voltage bar in the television receiver as a means of saving energy. Feedback of this type, however, entails problems when several stages at the same operating voltage release more energy than they absorb. If more energy is returned than is consumed, the rectifier diode will block, and the operating voltage will increase until the consumption of the increased energy is in equilibrium again.

How the invention can be applied to a circuit for generating horizontal-deflection current in conjunction with a rectifier modulator will now be described. The circuit for generating a horizontal-frequency deflection current is supplied with an operating voltage $U_S$ obtained from a stabilized source 1 of external power. The voltage can be connected to ground through a winding 2 in a transformer 3 and through an electronic switch 5 that is tripped at regular intervals by means of line-frequency pulses from a control circuit 4. The horizontal-deflection current flow to ground through a deflection coil 6, through a bridge coil 7, and through a capacitor 8. The circuit is closed in the other direction by way of flyback diodes 9 and 10. The vertical-frequency modulated current that the horizontal-deflection current needs in order to carry out the east-to-west correction is derived from the deflection circuit by way of an incoupling coil 11. The modulated current is generated by a control circuit (a TEA 2031 e.g.) that is in itself known. The energy obtained from the deflectin circuit is returned to the source of operating voltage $U_B$ through a diode 13. Operating voltage $U_B$ is generated at a capacitor 16 from a winding 14 by way of a rectifier 15. The modulated voltage $U_M$ at the output terminal of control circuit 12 will always be lower than operating voltage $U_B$. When, accordingly, an appliance breaks down due to a defect and more energy is supplied through recirculation diode 13, it may occur that rectifier diode 15 is supplied with current and operating voltage $U_B$ will increase. Any sensitive components, like integrated circuits for instance, that are connected to them will be destroyed. The excess energy can be eliminated by means of a resistor, although this measure would be detrimental to the efficiency of the circuit.

Coupling a diode 17 in through an appropriately dimensioned secondary winding 18 makes it possible to supply the energy into a higher operating voltage. This can be done in a practical way by way of the already stabilized operating voltage $U_S$, which is kept constant by the controlled external-power section. The recirculated energy is available for horizontal deflection. The number n of turns in secondary winding 18 ensures that the negatively oriented flyback voltage $U_R$ occurring there is just high enough to attain the potential of the generated operating voltage $U_B$.

FIG. 2 illustrates what happens to the voltages and currents at various stages of operation.

FIG. 2a illustrates the secondary voltage $U_1$ at the top of winding 14. Operating voltage $U_B$ occurs downstream of rectifier 15 at capacitor 16. The higher and stabilized operating voltage $U_S$ is also illustrated, as is the voltage $U_2$ at the diode end of secondary winding 18. Flyback voltage $U_R$ is oriented during time T in such a way that it will so to speak become immersed in operating voltage $U_B$. As soon as flyback voltage $U_R$ becomes lower than operating voltage $U_B$, diode 17 will open and a current I can flow at operating voltage $U_S$ (FIG. 2b). Since this occurs during horizontal flyback, oscillations will not be detrimental. If operating voltage $U_B$ increases for any reason to $U_B'$, flyback voltage $U_R$ will become immersed so deeply in it that an accordingly high current $I''$ will be recirculated (FIG. 2b). Thus, the higher the operating voltage rises, the more powerful the current through secondary winding 18. The current-flow time will also be extended as a result of the form of the flyback voltage, which has an even more stabilizing effect on operating voltage $U_B$.

We claim:

1. A circuit for limiting an operating voltage obtained from a secondary winding of a transformer through a rectifier, comprising: a transformer with a primary winding and a secondary winding, a first operating voltage obtained from said secondary winding, said primary winding being at a second operating voltage that is higher than and stabilized in relation to said first operating voltage; an electronic switch for switching over said second operating voltage to a reference potential, said electronic switch tripping at regular intervals; a diode and another secondary winding on said transformer for switching over said first operating voltage to said second operating voltage, said diode being polarized in the through pass direction.

2. A circuit as defined in claim 1, wherein said electronic switch has a flyback voltage, said secondary winding having a number of turns dimensioned to ensure that said flyback voltage is higher than the difference between the stabilized second operating voltage and said first operating voltage when said electronic switch is blocked.

3. A circuit as defined in claim 1, wherein said diode has a cathode with a flyback voltage, said secondary winding having a polarity ensuring that said flyback voltage drops sometimes below said first operating voltage to create a current path during the flyback that extends through said diode and through said secondary winding to said second operating voltage.

4. A circuit as defined in claim 1, wherein said circuit is used for horizontal deflection in a television receiver, said first operating voltage being limited and being generated for switching horizontal deflection current over to east-to-west modulation.

* * * * *